(12) United States Patent
Park et al.

(10) Patent No.: US 7,316,072 B2
(45) Date of Patent: Jan. 8, 2008

(54) XY STAGE MODULE, STORAGE SYSTEM EMPLOYING THE SAME AND METHOD FOR FABRICATING THE XY STAGE MODULE

(75) Inventors: Hong-sik Park, Seoul (KR); Ju-hwan Jung, Seoul (KR); Seung-bum Hong, Seongnam-si (KR); Dong-ki Min, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/546,240

(22) Filed: Oct. 12, 2006

(65) Prior Publication Data

US 2007/0157479 A1    Jul. 12, 2007

(30) Foreign Application Priority Data

Jan. 9, 2006    (KR) ..................... 10-2006-0002371

(51) Int. Cl.
    *G01B 5/004*    (2006.01)

(52) U.S. Cl. ......................... 33/1 M; 33/568; 33/573

(58) Field of Classification Search ................. 33/1 M, 33/1 N, 568, 573
See application file for complete search history.

(56) References Cited

U.S. PATENT DOCUMENTS 6,817,104 B2 * 11/2004 Kaneko et al. .............. 33/1 M
7,240,434 B2 *  7/2007 Lee et al. .................... 33/1 M

* cited by examiner

*Primary Examiner*—Yaritza Guadalupe-McCall
(74) *Attorney, Agent, or Firm*—Sughrue Mion, PLLC

(57) ABSTRACT

An XY stage module, a storage system including the same and a method for facating the XY stage module are provided. The XY stage module includes: a base; an XY stage horizontally moving above the base in a first direction and a second direction that is orthogonal to the first direction; a supporting unit disposed at the base for elastically supporting the XY stage; a stiffener for preventing the XY stage from being rotated; and a position sensor having a movable comb-shaped structure disposed at one side of the stiffener and having at least one movable comb and a fixed comb-shaped structure fixed on the base and having at least one fixed comb meshed with the movable comb to be separated at a predetermined gap for measuring a movement of the XY stage in the first direction and the second direction.

19 Claims, 12 Drawing Sheets

XY STAGE MODULE, STORAGE SYSTEM EMPLOYING THE SAME AND METHOD FOR FABRICATING THE XY STAGE MODULE

CROSS-REFERENCE TO RELATED PATENT APPLICATION

This application claims priority from Korean Patent Application No. 10-2006-0002371, filed on Jan. 9, 2006, in the Korean Intellectual Property Office, the disclosure of which is incorporated herein in its entirety by reference.

BACKGROUND OF THE INVENTION

1. Field of the Invention

The present invention relates to an XY stage module, a storage system having the same and a method for fabricating the XY stage module, and more particularly, to an XY stage module having a position sensor measuring a position of an XY stage that horizontally moves, a storage system having the same and a method for fabricating the XY stage module.

2. Description of the Related Art

Recently, micro electromechanical system (MEMS) technologies have been applied to develop various magnetic devices, such as, magnetic compasses, electromagnetic scanners and electromagnetic valves. In particular, there is research being done to develop a MEMS type data storage system using scanning probe microscope (SPM) technology.

Such a data storage system includes a plurality of fixed probe arrays and an XY stage having a medium. The data storage system moves the XY stage in a two-dimensional plane with the probe arrays fixed to record information to the medium or to read information from the medium. In order to record and read information, the position of the XY stage having the medium must be controlled very accurately. Therefore, it is essential that the MEMS storage system have a position sensor that accurately measures the position of the XY stage.

SUMMARY OF THE INVENTION

Aspects of the present invention provide an XY stage module having a position sensor for accurately measuring a position of an XY stage, a storage system employing the same and a method for fabricating the position sensor used when forming an XY stage module without requiring additional fabricating processes.

According to an aspect of the present invention, there is an XY stage module comprising: a base; an XY stage horizontally moving above the base in a first direction and a second direction that is orthogonal to the first direction; a supporting unit disposed on the base for elastically supporting the XY stage; a stiffener which prevents the XY stage from rotating; and a position sensor comprising a movable comb-shaped structure disposed at one side of the stiffener and comprising at least one movable comb, and a fixed comb-shaped structure fixed on the base and comprising at least one fixed comb meshed with the at least one movable comb separated by a predetermined gap for measuring a movement of the XY stage in the first direction and the second direction according to a meshing degree of the at least one movable comb and the at least one fixed comb.

According to another aspect of the present invention, there is provided a storage system comprising: an XY stage module; and a probe array disposed above a medium mounted on the XY stage which records and reads information on each cell of the medium, wherein the XY stage module comprises: a base; an XY stage horizontally moving above the base to a first direction and a second direction wherein the second direction is orthogonal to the first direction; a supporting unit disposed at the base which elastically supports the XY stage; a stiffener which prevents the XY stage from being rotated; a position sensor comprising a movable comb-shaped structure disposed at one side of the stiffener and comprising at least one movable comb, and a fixed comb-shaped structure fixed on the base and comprising at least one fixed comb meshed with the at least one movable comb and separated by a predetermined gap for measuring a movement of the XY stage in the first direction and the second direction according to a meshing degree of the at least one movable comb and the at least one fixed comb.

According to still another aspect of the present invention, there is provided a method of fabricating an XY stage module comprising: preparing a first board sectored into a center area as an XY stage, a first peripheral area and a second peripheral area corresponding to a fixed comb-shaped structure and a supporting member, respectively, and a connecting area corresponding to a supporting unit connected to the center area and the second peripheral area; preparing a second board corresponding to a base; forming a groove in the center area and the connecting area on the bottom of the first board; bonding the bottom of the first board to the second board; forming a sensor electrode pad at a first peripheral area on the top of the first board; and forming a supporting structure between the center area and the second peripheral area and a comb-shaped structure having combs meshed with one another between the center area and the first peripheral area by etching the first board.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS OF THE PRESENT INVENTION

The present invention will now be described more fully with reference to the accompanying drawings, in which exemplary embodiments of the invention are shown.

Figure 1:
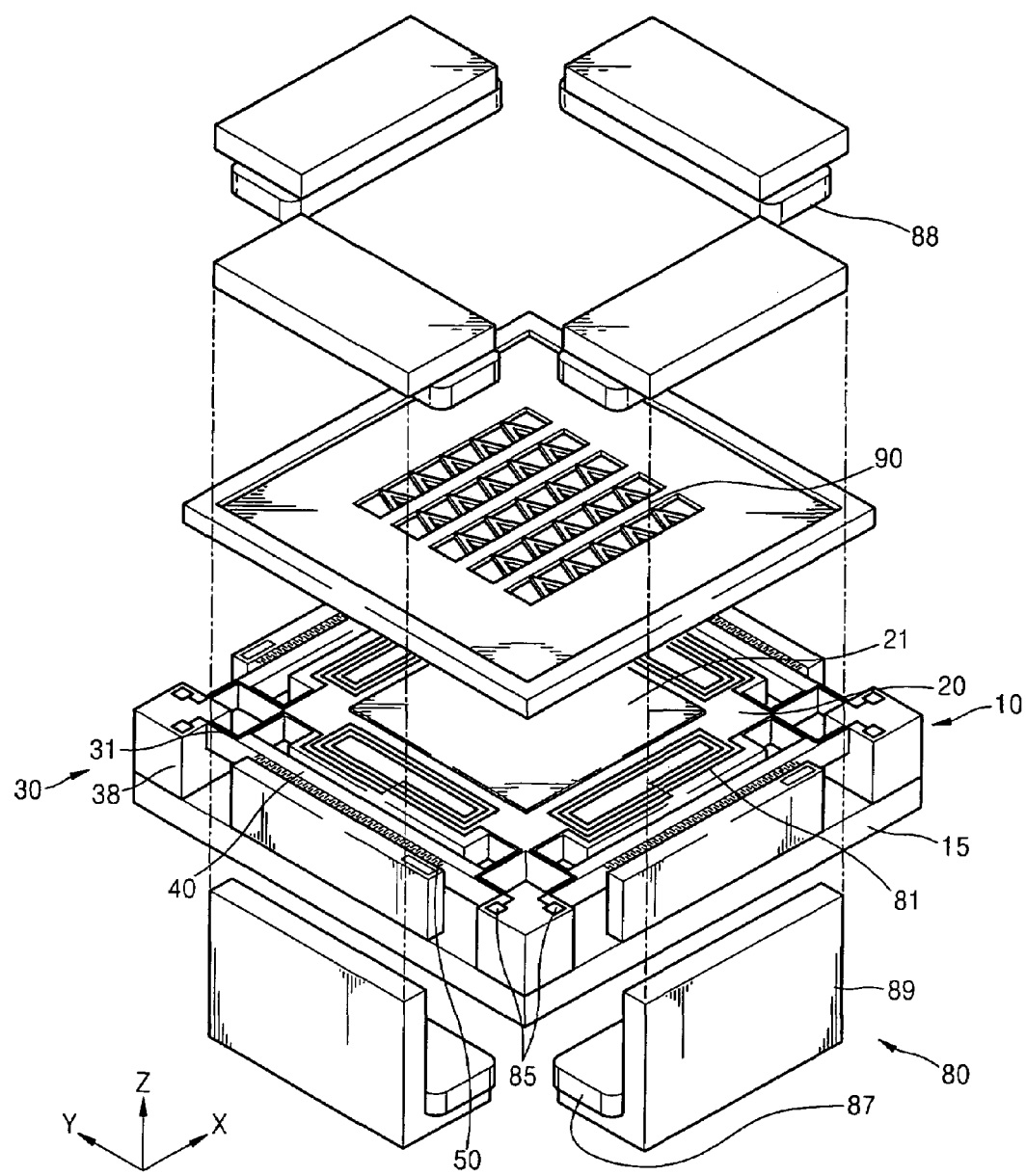
FIG. 1 is an exploded perspective view of a storage system according to an exemplary embodiment of the present invention.
Figure 2A:
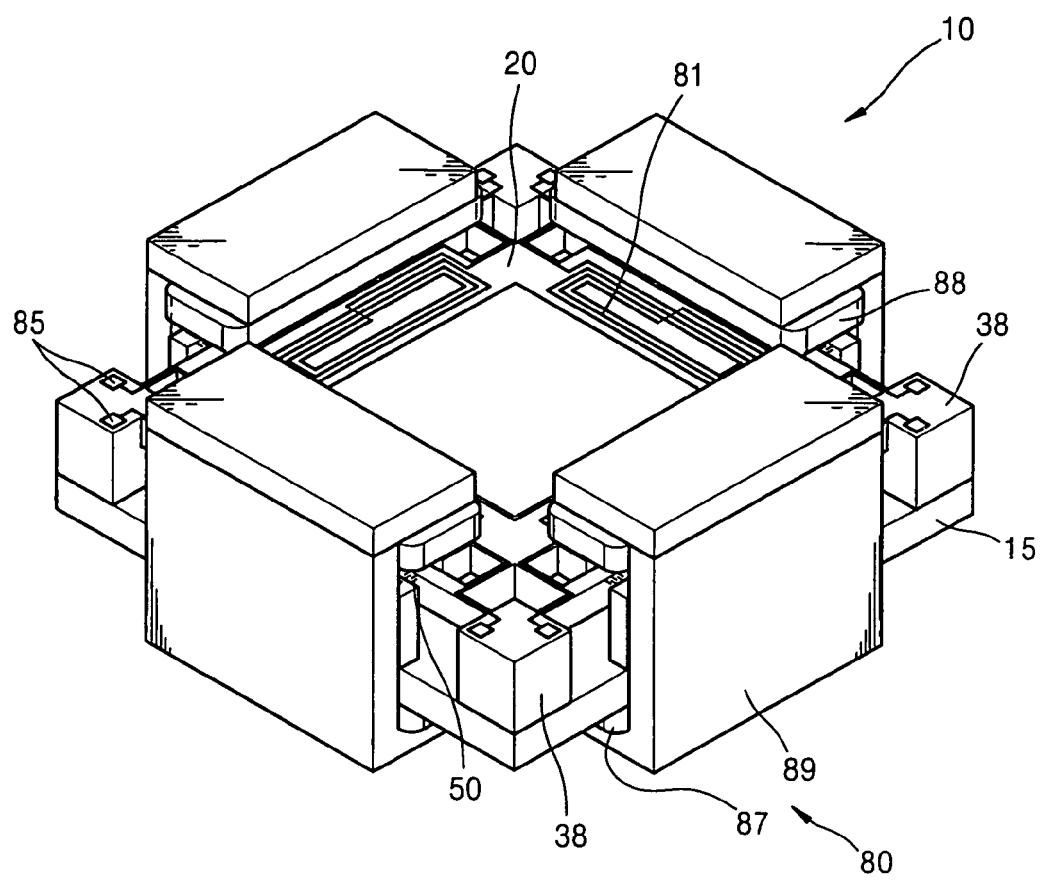
FIG. 2A is a perspective view of the storage system shown in FIG. 1.
Figure 2B:
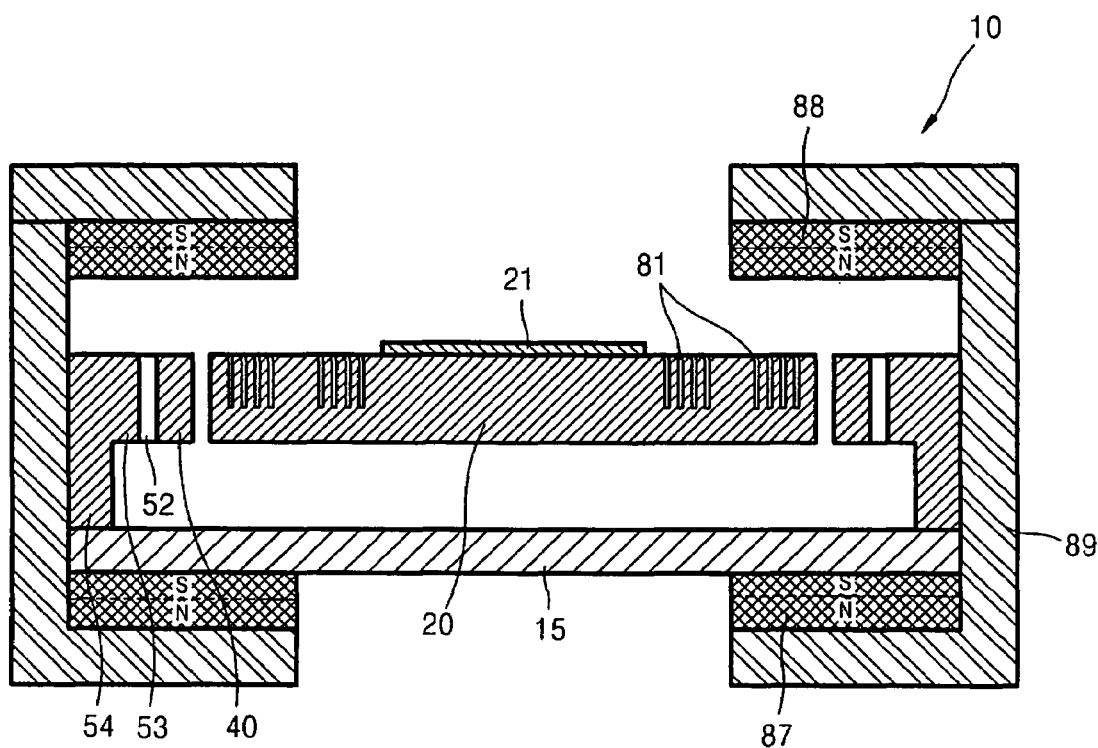
FIG. 2B is a cross-sectional view of the storage system shown in FIG. 1.

FIG. 1 is an exploded perspective view of a storage system according to an exemplary embodiment of the present invention, and FIGS. 2A and 2B are a perspective view and a cross-sectional view, respectively, of the storage system shown in FIG. 1.

Referring to FIGS. 1, 2A and 2B, the storage system includes an XY stage module 10 on which a medium 21 is placed to record information, and a probe array 90 fixed above the medium 21. The probe array 90 is omitted from FIGS. 2A and 2B to simplify the description of the storage system.

The XY stage module 16 includes a base 15, the XY stage 20 with the medium 21 where information is recorded, a supporting unit 30 for elastically supporting the XY stage 20 and separating it from the base 15 at a predetermined distance, a stiffener 40 for preventing the XY stage 20 from being rotated, and a position sensor 50 for measuring a position of the medium 21 with respect to the probe array 90.

As described above, in the present exemplary embodiment, the storage system includes the XY stage 20 with the information recorded medium 21. However, the exemplary embodiment of the present invention is not limited thereby. For example, an XY stage module 10 analyzing a sample on the XY stage 20 using the probe array 90 may be used.

The probe array 90 includes at least one micro tip (not shown) to record information in each cell, which is a unit of storing information, of the medium 21 or to read information recorded in the cells of the medium 21.

The information is recorded to the medium 21 or is read from the medium 21 through the tip of the probe array 90 by changing its positions to the relevant cells of the medium 21 on an XY plane. The positions of the cells of the medium 21 are reached by horizontally moving the XY stage 20. In order to horizontally move the XY stage 20, the storage system includes an electromagnetic driving unit 80 for horizontally moving the XY stage 20 in a first direction and a second direction on the base 15, wherein the first direction denotes a X direction and the second direction denotes a Y direction which is orthogonal to the first direction.

The electromagnetic driving unit 80 includes a plurality of flat coils 81 disposed at the XY stage 20, a plurality of permanent magnets 87 and 88 arranged below and above the XY stage 20, respectively, and a yoke 89 for forming a closed loop of the magnetic circuit with the permanent magnets 87 and 88. A reference numeral 85 denotes a driving electrode pad for supplying a current to the coil 81.

The coil 81 may be formed at the topside of the XY stage 20 as shown. However, the exemplary embodiment of the present invention is not limited thereby. For example, the coil 81 may be formed on the bottom side of the XY stage 20 or to penetrate the XY stage 20.

In the present exemplary embodiment, the XY stage 20 has a rectangle shape and includes four coils 81 at each side thereof. A pair of permanent magnets 87 and 88 having opposite polarities are disposed below and above the four coils 81. The XY stage 20 moves on the XY plane according to the electromagnetic force created by the current flowing along the coil 81. However, the number of coils 81 and permanent magnets 87 and 88 are not limited by the present exemplary embodiment. The electromagnetic driving unit 80 includes at least two coils 81 and two pairs of permanent magnets 87 and 88 for driving the XY stage 20 in the X direction and the Y direction.

Figure 3:
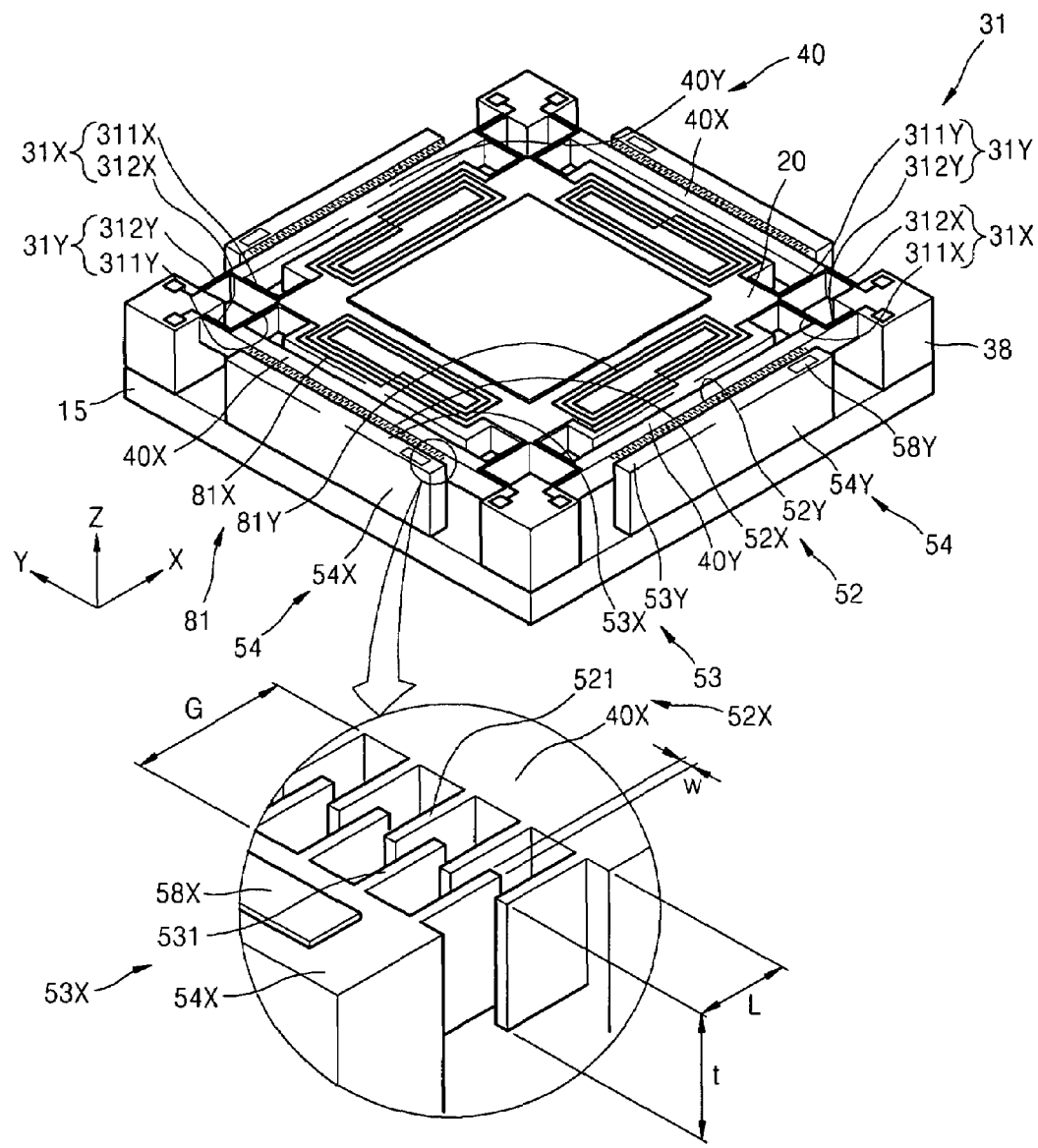
FIG. 3 is a schematic perspective view of the XY stage module included in the storage system shown in FIG. 1.

FIG. 3 is a perspective view of an XY stage module 10 having the XY stage 20 and the base 15 shown in FIG. 1.

Referring to FIG. 3, the supporting unit 30 includes a plurality of elastic beams 31 disposed at corners of the XY stage 20 and four supporting members 38 disposed at corners of the base 15 and connected to the elastic beams 31.

The elastic beams include a first elastic beam 31X that is bent toward the X direction and a second elastic beam 31Y bent toward the Y direction. The first elastic beam 31X includes a first inner elastic beam 311X connected to a corner of the XY stage 20 and a first outer elastic beam 312X connected to the supporting member 38. The second elastic beam 31Y includes a second inner elastic beam 311Y connected to a corner of the XY stage 20 and a second outer elastic beam 312Y connected to the supporting member 38. The first inner elastic beam 311X is connected to the second outer elastic beam 312Y and the second inner elastic beam 311Y is connected to the first outer elastic beam 312X. Therefore, the XY stage 20 moves by bending the elastic beam 31 in the X or the Y directions.

The stiffener 40 is disposed at each side of the XY stage 20 in parallel to and separated by a predetermined distance from each side. The elastic beams 31 are connected to both ends of the stiffener 40 to prevent the XY stage 20 from being rotated when the XY stage 20 moves horizontally. Accordingly, the stiffener 40 includes a first stiffener 40X disposed in parallel to the Y direction and a second stiffener 40Y disposed in parallel to the X direction. The first stiffener 40X is elastically supported by the first outer elastic beam 312X movable in the X direction and connected to the second inner elastic beam 311Y. The second stiffener 40Y is elastically supported by the second outer elastic beam 312Y to be movable to the Y direction and is connected to the first inner elastic beam 311X.

The position sensor 50 shown in FIG. 1 includes a movable comb-shaped structure 52 and a fixed comb-shaped structure 53 and measures a movement of the XY stage 20 in the first and the second direction according to a meshing degree of the movable comb-shaped structure 52 and the fixed comb-shaped structure 53. The position sensor 50 also includes a fixed member 54 having a first fixed member 54X and a second fixed member 54Y.

The movable comb-shaped structure 52 includes a first movable comb-shaped structure 52X that is disposed at the first stiffener 40X and movable in the X direction and a second movable comb-shaped structure 52Y that is disposed at the second stiffener 40Y and movable in the Y direction. The fixed comb-shaped structure 53 includes a first and a second fixed comb-shaped structure 53X and 53Y which are disposed at the base 15 and meshed with the first and the second movable comb-shaped structure 52X and 52Y, respectively.

The first movable comb-shaped structure 52X movable in the first direction and the first fixed comb-shaped structure 53X are used to measure the movement of the XY stage in the X direction. The second movable comb-shaped structure 52Y movable in the second direction and the second fixed comb-shaped structure 53Y are used to measure the movement of the XY stage in the Y direction.

Referring to FIG. 3, the first movable comb-shaped structure 52X includes at least one of movable combs 521 formed by extensions from one side of the first stiffener 40X. The first fixed comb-shaped structure 53X includes a first fixed member 54X disposed on the base 15 and at least one of fixed combs 531 formed by extensions from the first fixed member 54X and meshed with the movable combs 521 and separated a predetermined distance G.

Similarly, the second movable comb-shaped structure 52Y includes at least one of movable combs 521 extended from one side of the second stiffener 40Y. The second fixed comb structure 53Y includes a second fixed member 54Y disposed on the base 15 and at least one of fixed combs 531 meshed with the movable comb 521 and separated a predetermined distance G.

In an exemplary embodiment, the fixed combs 531 and the movable combs 521 have the same width, length and thickness.

Furthermore, the fixed combs 531 and the movable combs 521 may be separated by the same distance.

In an exemplary embodiment, the thickness t of the fixed combs 531 and the movable combs 521 is identical to the thickness of the stiffener considering the fabrication process.

The movable comb-shaped structures 52X and 52Y move in the X direction or the Y direction, respectively, according to the movement of the XY stage 20, and the fixed comb-shaped structures 53X and 53Y are fixed with respect to the movement of the XY stage 20.

Each of the movable comb-shaped structures 52X and 52Y and the fixed comb-shaped structures 53X and 53Y may be made of a conductive material, such as silicon. In an exemplary embodiment, the movable comb-shaped structures 52X and 52Y and the fixed comb-shaped structures 53X and 53Y may be made of single crystalline silicon having a superior conductivity.

The movable comb-shaped structures 52X and 52Y are electrically insulated from the fixed comb-shaped structures 53X and 53Y. For example, a glass board having a superior insulation property may be used as the base 15 to electrically insulate the fixed comb-shaped structures 53X and 53Y disposed at the base 15 from the movable comb-shaped structures 52X and 52Y.

A first and a second sensor electrode pad 58X and 58Y are disposed above the first and the second fixed members 54X and 54Y, and they are electrically connected to an external device using a wire bonding process.

In the present exemplary embodiment, the movable and fixed comb-shaped structures 52 and 53, respectively, are disposed at four sides of the XY stage 20 but the present invention is not limited thereby. In order to measure the movement of the XY stage 20 in the X direction and the Y direction, at least one movable and fixed comb-shaped structure 52 and 53 are disposed at the sides parallel to the X direction and the Y direction respectively.

Hereinafter, the operation of the position sensor 50 for the XY stage module 10 according to the present exemplary embodiment will be described.

Figure 4:
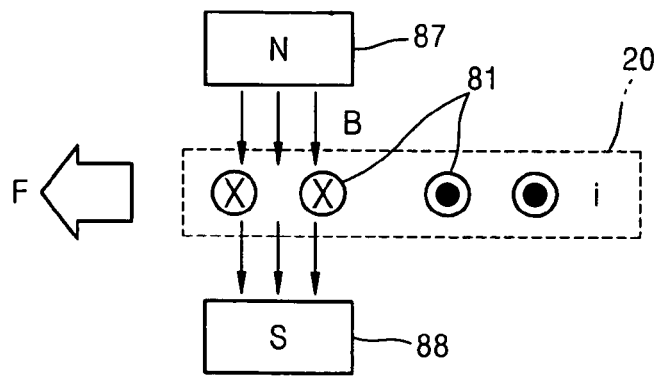
FIG. 4 is a view showing an operating principle of the XY stage module of the storage system shown in FIG. 1.

FIG. 4 is a view for describing an operating principle of the XY stage module 10 of the storage system shown in FIG. 1. As shown in FIG. 2B, the pair of the permanent magnets 87 and 88 having opposite polarities are disposed below and above the XY stage 20 to face one another, and a part of the coil 81 formed at the XY stage 20 is placed between the permanent magnets 87 and 88. An electromagnetic field B is created at a space formed between the permanent magnets 87 and 88. If the current i flows along the coil 81, the XY stage 20 having the coil 81 receives a force F in a vertical direction with respect to the direction of the electromagnetic field B and the current i.

At least two sets of two coils 81 are independently disposed to drive the XY stage 20 in the XY plane. In the present exemplary embodiment, two of the first and the second coils 81X and 81Y shown in FIG. 3 are disposed in order to move the XY stage in the X direction and the Y direction.

Figure 5A:
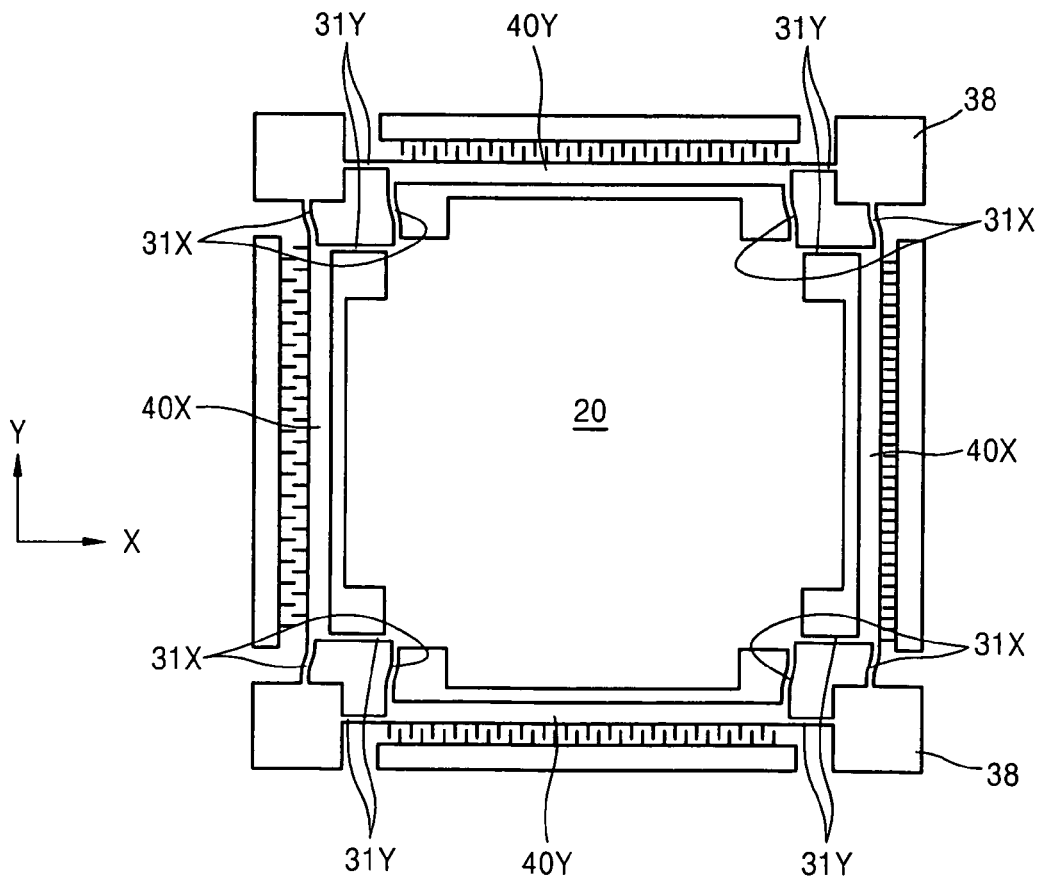
FIGS. 5A and 5B show comb-shaped structures transformed by driving the XY stage according to an exemplary embodiment of the present invention.

FIG. 5A shows the XY stage 20 moving in the X direction. The elastic beam 31 may be easily bent in a longitudinal direction, although it is not elastically bent in a lateral direction. Therefore, the first elastic beam 31X, vertical to the X direction, is bent in the longitudinal direction and the first stiffener 40X also moves in the X direction with the XY stage 20 when the XY stage 20 moves in the X direction. On the contrary, the second stiffener 40Y is not moved because of the second elastic beam 31Y that supports the second stiffener 40Y. Similarly, when the XY stage 20 moves in the Y direction, the second stiffener 40Y moves in the Y direction and the first stiffener 40X is not moved.

Figure 5B:
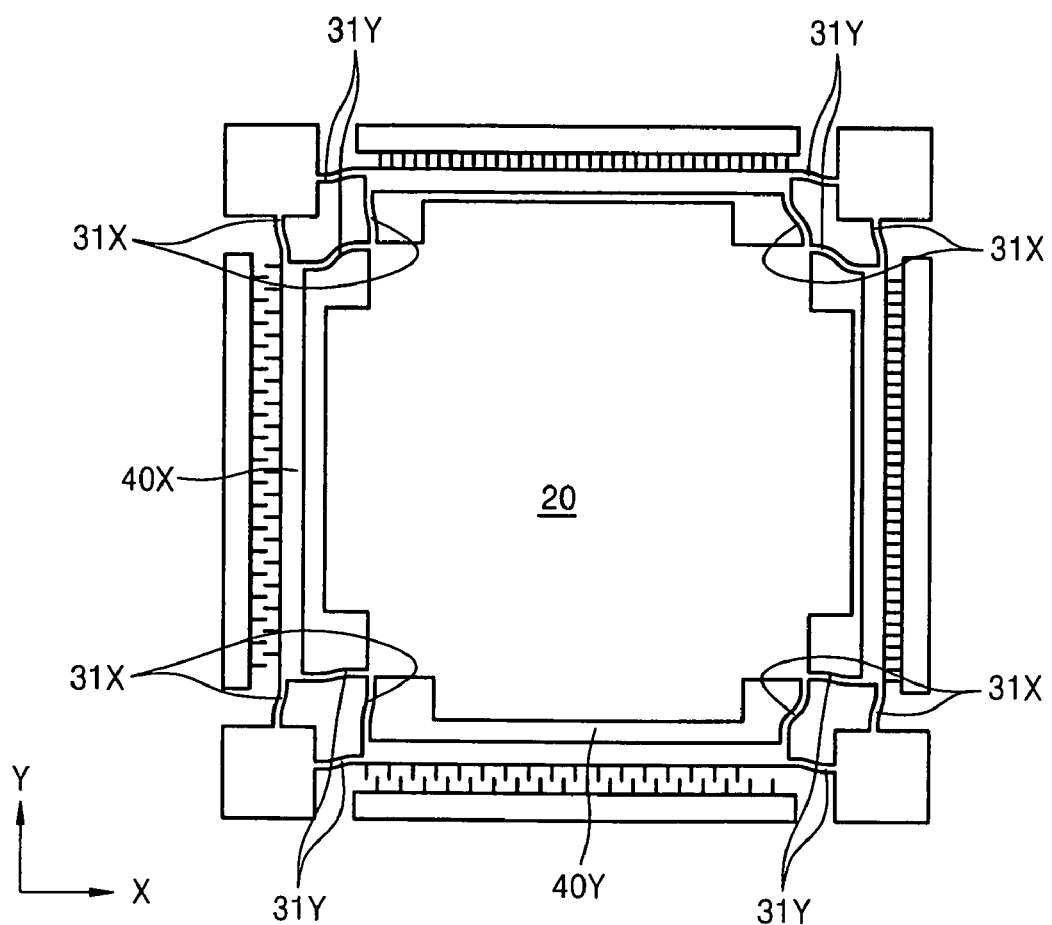

FIG. 5B shows the XY stage 20 moving in both the X direction and the Y direction. In this case, the first stiffener 40X moves in the X direction only and the second stiffener 40Y moves in the Y direction only although both of the first and the second elastic beams 31X and 31Y are bent. That is, the first stiffener 40X moves only when the XY stage 20 moves in the X direction and the second stiffener 40Y moves only when the XY stage 20 moves in the Y direction. Therefore, a vector sum of a displacement of the first stiffener 40X in the X direction and a displacement of the second stiffener 40Y in the Y direction denotes a position of the XY stage 20 in the X direction and the Y direction.

Figure 6A:
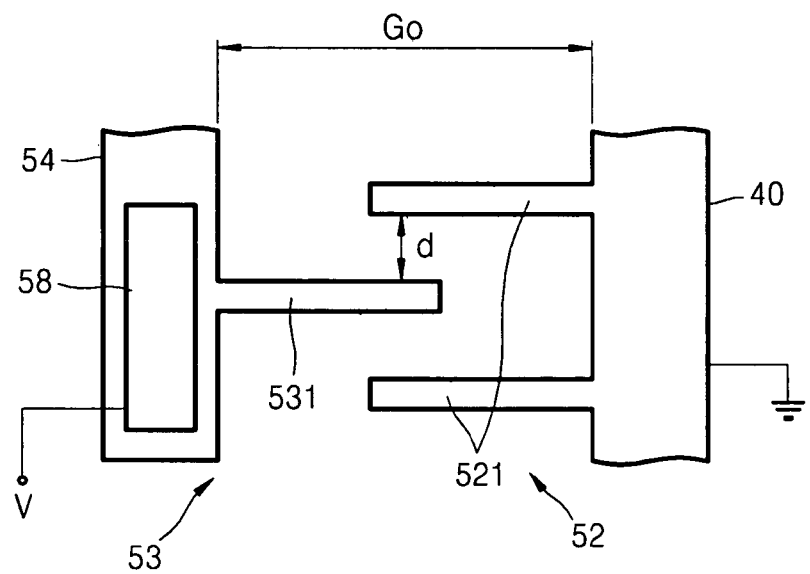
FIGS. 6A and 6B show an operating principle of a position sensor for an XY stage module according to an exemplary embodiment of the present invention.
Figure 6B:
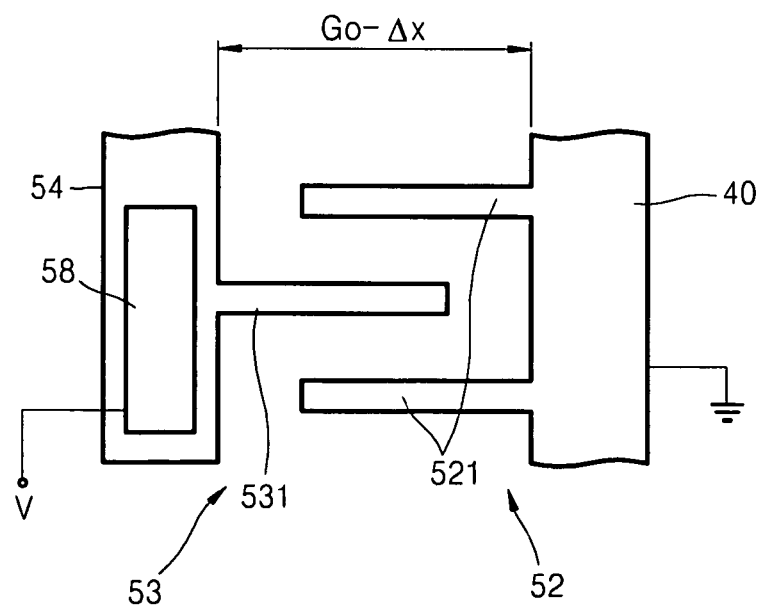

FIGS. 6A and 6B are views for describing an operating principle of operation of a position sensor 50 for an XY stage module 10 according to an exemplary embodiment of the present invention. FIG. 6A shows the states of the comb-shaped structures 52 and 53 when an external force is not applied to the XY stage 20, and FIG. 6B shows the XY stage 20 moving in one direction by the external force. That is, FIG. 6B shows the gap of the aperture of the comb-shaped structures 52 and 53 narrowed by the external force. $G_0$ denotes the gap between the movable comb-shaped structure 52 and the fixed comb-shaped structure 53 when the external force is not applied.

Because the movable comb-shaped structure 52 is electrically insulated from the fixed comb-shaped structure 53, the comb-shaped structures 52 and 53 become a type of a parallel plate capacitor when a potential difference is applied between the movable comb-shaped structure 52 and the fixed comb-shaped structure 53. Therefore, a capacitance variation ΔC of the comb-shaped structures 52 and 53 can be measured by measuring an electric charge variation in the fixed comb-shaped structure 53 using the sensor electrode pad 58 attached thereto.

The gap of the comb-shaped structures 52 and 53 shown in FIG. 6B is narrowed as Δx in comparison to the gap $G_0$. In this case, the capacitance variation ΔC of the comb-shaped structures 52 and 53 may be expressed as the following Eq. 1 if only the two movable combs 521 and the single fixed comb 531 interposed between the two movable combs 521 are considered.

$$\Delta C = 2\varepsilon \frac{\Delta x E t}{d} \qquad \text{Eq. 1}$$

In Eq. 1, ∈ is a dielectric constant, t denotes a thickness of the movable comb-shaped structure 52 and the fixed comb-shaped structure 53 shown in FIG. 3, and d denotes a distance between the movable comb-shaped structure 52 and the fixed comb-shaped structure 53.

The capacitance variation ΔC may be obtained by measuring the electric charge variation using the sensor electrode pad 58. The capacitance variation ΔC may be transformed into a distance variation Δx between the comb-shaped structures 52 and 53 using Eq. 1. Since the distance variation Δx between the comb-shaped structures 52 and 53 denotes the movement of the XY stage 20 in the X direction, the location of the XY stage 20 in the X direction may be decided by measuring the capacitance variation ΔC of the first movable comb-shaped structure 52X and the first fixed comb-shaped structure 53X. Similarly, the location of the XY stage 20 in the Y direction may be decided by measuring the capacitance variation ΔC of the second movable comb-shaped structure 52Y and the second fixed comb-shaped structure 53Y.

Accordingly, the position of the XY stage 20 can be accurately measured without being influenced by the external environment factor such as temperature and humidity by measuring the position of the XY stage 20 using the capacitance variation ΔC.

In Eq. 1, the proportional constant 2 denotes the number of gaps between the movable comb-structure 521 and the fixed comb-structure 531. Therefore, if the movable combs 521 and the fixed combs 531 are sufficiently formed, the proportional constant may increase, accordingly. That is, a desired accuracy of measuring a position may be achieved by forming a sufficient number of movable combs 521 and fixed combs 531. For example, if the total number of the movable combs 521 and the fixed combs 531 are 155 with t=100 μm, d=10 μm and Δx=50 μm, the capacitance variation ΔC is about 0.68 pF. Therefore, the position sensor 50 according to the exemplary embodiment of the present invention provides the accurate control of position when high density information is recorded.

Hereinafter, a method of fabricating the XY stage module 10 having the position sensor 50 according to an exemplary embodiment of the present invention will be described. Since a method of etching and a method of forming a thin film are well-known to those skilled in the art, the details thereof are omitted.

A first board 100 for the XY stage 20 and a second board 200 for the base 15 are prepared.

Figure 7:
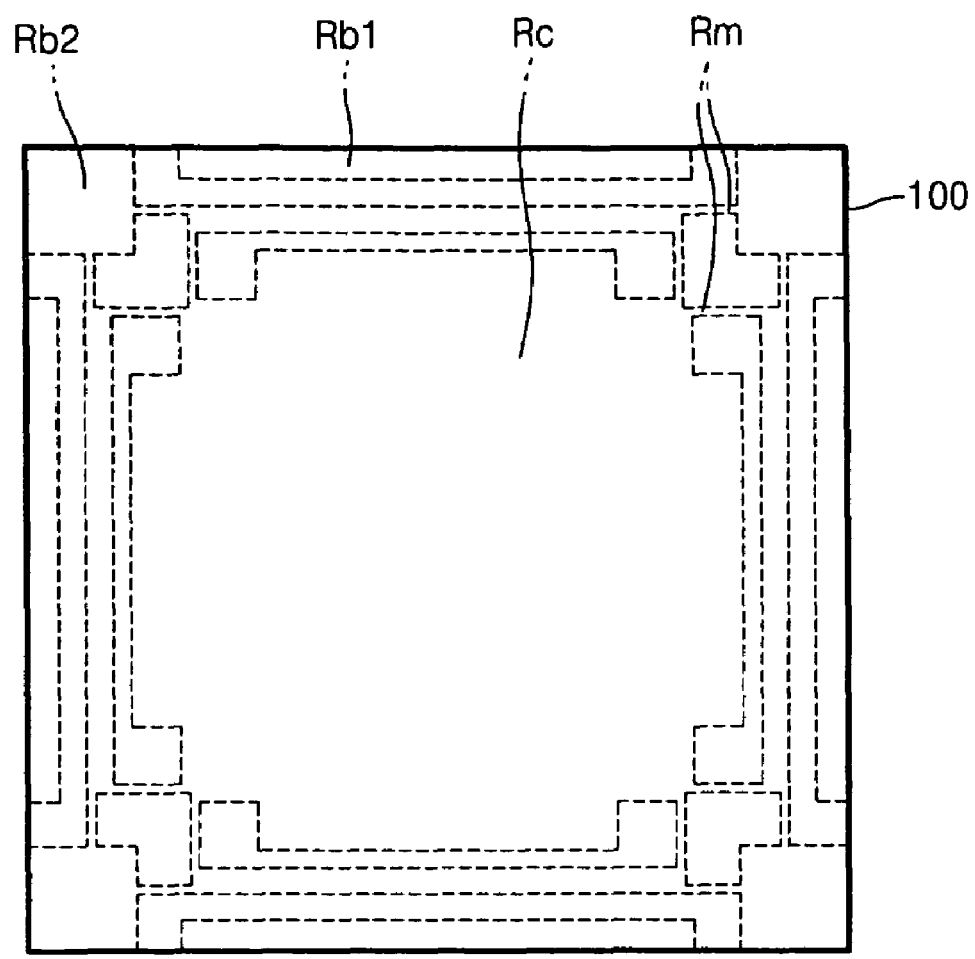
FIG. 7 is a plane view of a first board which is a body of an XY stage according to an exemplary embodiment of the present invention.

FIG. 7 is a plan view of a first board according to an exemplary embodiment of the present invention. Referring to FIG. 7, the first board 100 is sectored into a center region Rc, a first peripheral region Rb1 and a second peripheral region Rb2 around the center region Rc to be separated at a predetermined distance, and a connecting region Rm connecting the center region Rc and the second peripheral region Rb2. Referring to FIG. 3, the center region Rc, the first peripheral region Rb1 and the second peripheral region Rb2 of the first board 100 correspond to the XY stage 20, the fixed members 54X and 54Y and the supporting member 38, respectively. The connecting area Rm corresponds to the elastic beam 31 and the stiffener 40. A silicon board is used as the first board 100.

FIGS. 8A through 8K are cross-sectional views for describing a method of manufacturing a position sensor for an XY stage module according to an exemplary embodiment of the present invention.

Figure 8A:
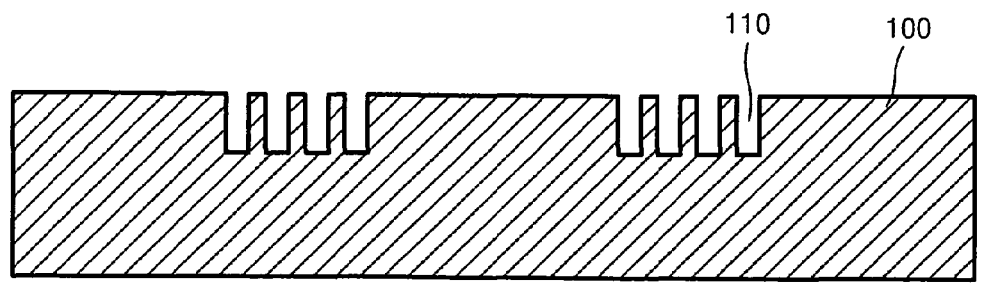
FIGS. 8A through 8K are cross-sectional views for describing a method of manufacturing a position sensor for an XY stage module according to an exemplary embodiment of the present invention.
Figure 8B:
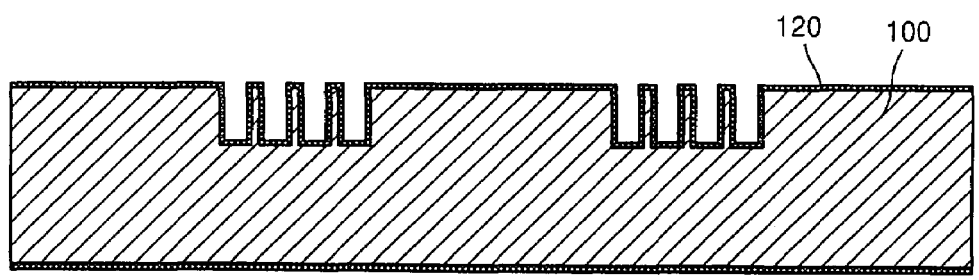

As shown in FIG. 8A, a spiral mask is patterned on the center area Rc of the top of the first board 100 and a spiral trench 110 is formed using an inductively coupled plasma—reactive ion etching (ICP-RIE). After forming the trench 110, a passivation layer 120 is formed on the first board 100 using thermal oxidation as shown in FIG. 8B.

Figure 8C:
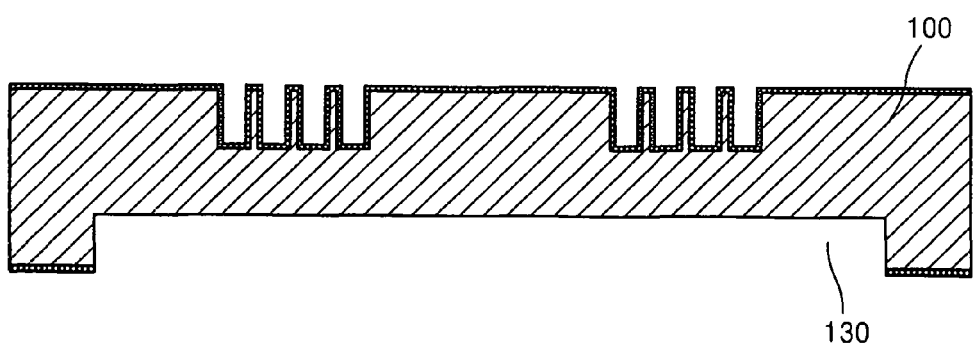

As shown in FIG. 8C, a groove 130 is formed to a predetermined depth on the bottom of the first board 100 by etching the center area Rc and the connection area Rm of the first board 100.

Figure 8D:
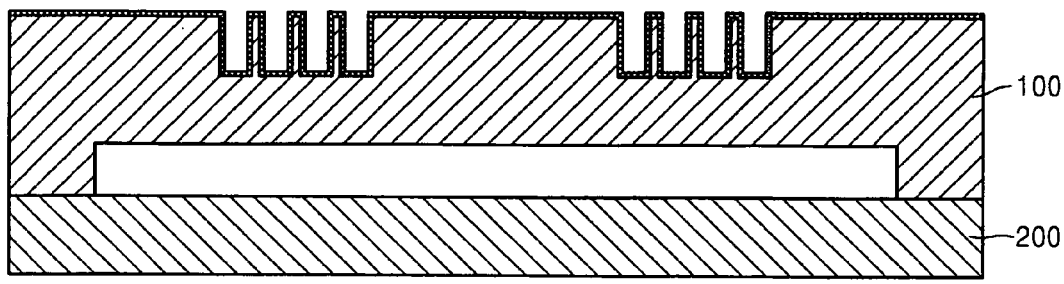

As shown in FIG. 8D, the second board 200 is adhered on the bottom of the first board 100. The second board 200 is made of a glass board. An anodic bonding may be used for bonding the second board 200 on the first board 100. The second board 200 corresponds to the base 15 shown in FIG. 3.

Figure 8E:
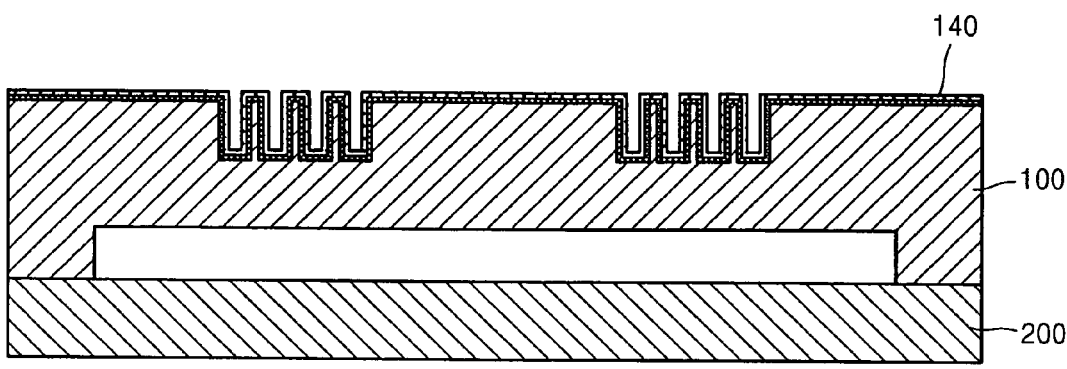
Figure 8F:
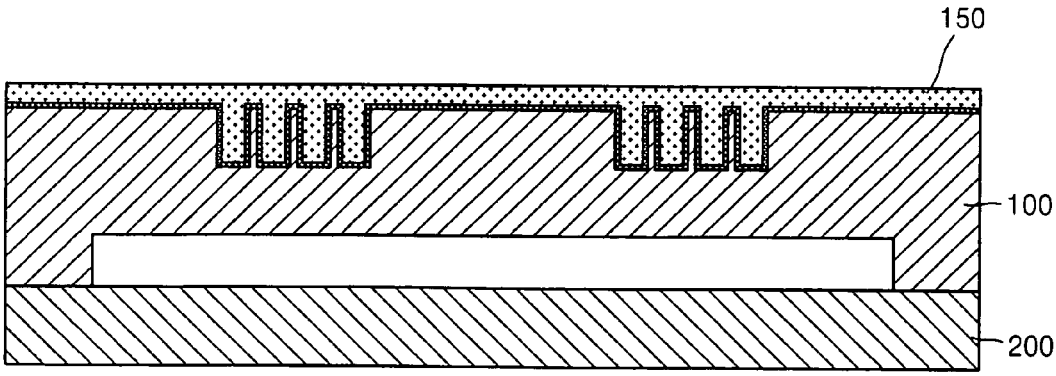

As shown in FIGS. 8E and 8F, a seed layer 140 is deposited on the top of the first board 100 and a metal layer 150 is formed on the seed layer 140 to fill the trenches. The seed layer 140 is formed by depositing chromium/gold (Cr/Au) using a sputtering deposition process. The metal layer 150 may be formed by electro-plating using the seed layer 140 as an electrode.

Figure 8G:
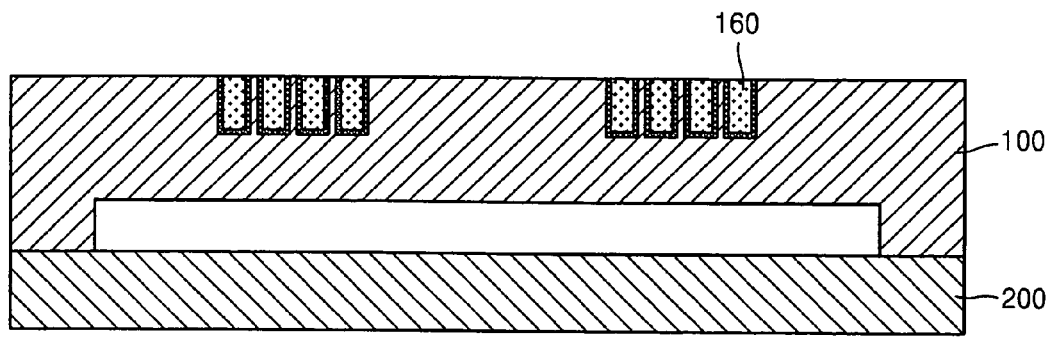

As shown in FIG. 8G, a coil 160 is formed by grinding the metal layer exposed above the trench 110 by a polishing process such as chemical mechanical polishing (CMP).

Figure 8H:
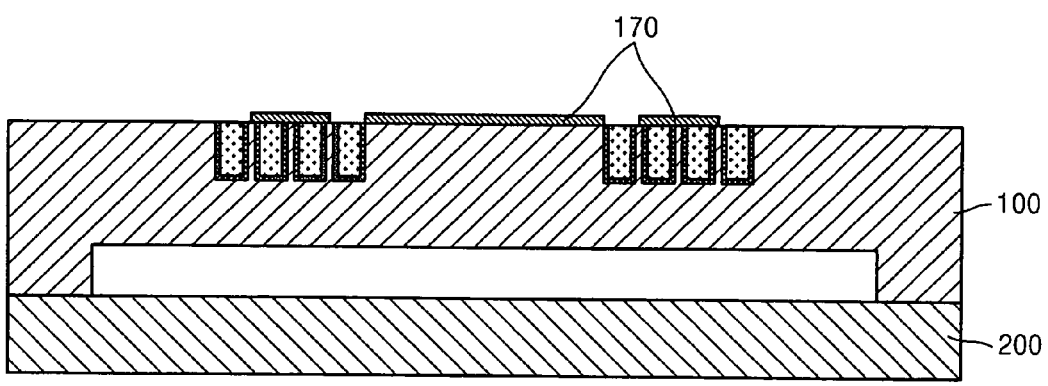
Figure 8I:
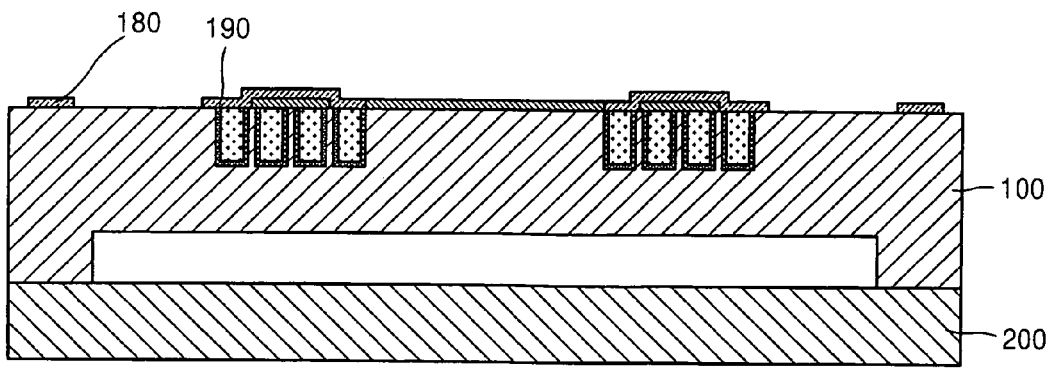

As shown in FIG. 8H, an insulating layer 170 is formed on the top of the coil 160. Then, a sensor electrode pad 180 is formed when a driving electrode pad 190 is formed on the top of the first board 100 and electrically connected to the coil 160. The insulating layer 170, for example, may be formed by patterning a polyimide and the electrode pads 180 and 190 may be formed by patterning gold/chromium (Au/Cr).

Figure 8J:
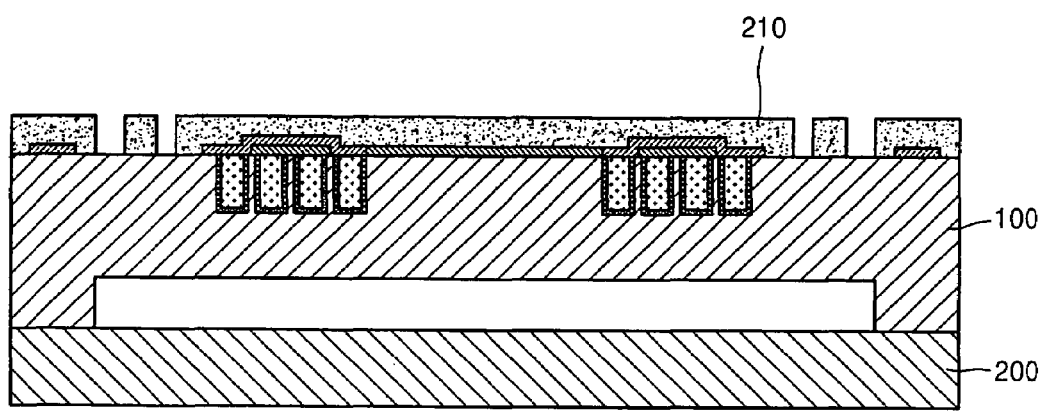
Figure 8K:
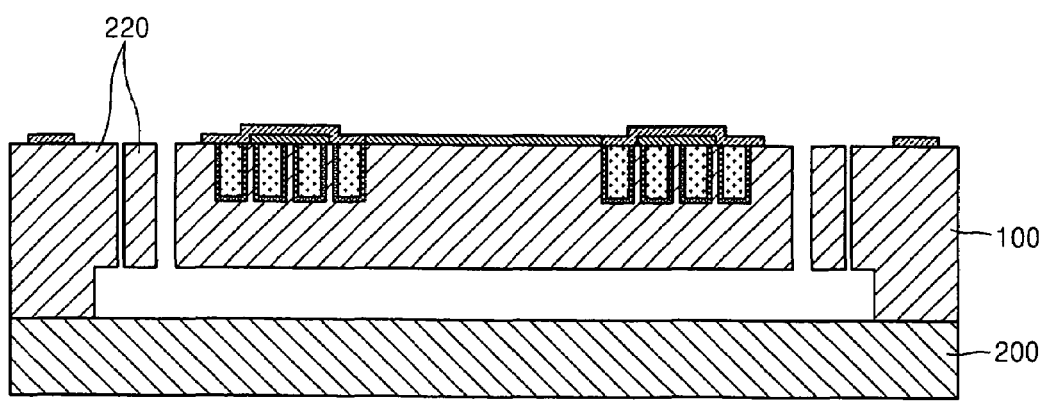

As shown in FIGS. 8J and 8K, a mask layer 210 of a supporting structure formed between the center area Rc and the second peripheral area Rb2 of the first board 100 and the comb-shaped structure 220 formed between the center area Rc and the first peripheral area Rb1 to be engaged with one another is patterned. Then, the supporting structure and the comb-shaped structure are formed by etching the first board.

According to the fabrication method of the present invention, the XY stage module 10 having the position sensor 50 is fabricated without performing additional fabrication processes for the position sensor 50 by forming the sensor electrode pad 160 and the comb-structure 220 while manufacturing the XY stage module 10.

As described above, the position sensor 50 of the XY stage module 10 according to the present invention uses the capacitance variation ΔC to measure the position of the XY stage 20. Therefore, the position of the XY stage is accurately measured without being influenced by the external environment factors such as temperature and humidity.

Accordingly, since such an XY stage module 10 is included, the storage system can accurately control the position of the XY stage 20. Therefore, the storage system according to the exemplary embodiments of the present invention records and stores high density information.

Furthermore, the position sensor 50 can be manufactured when fabricating the XY stage module 10 without performing additional fabrication processes for the position sensor 50 according to the fabricating method of the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An XY stage module comprising:
   a base;
   an XY stage horizontally moving above the base in a first direction and a second direction wherein the second direction is orthogonal to the first direction;

a supporting unit disposed on the base which elastically supports the XY stage;
a stiffener which prevents the XY stage from rotating; and
a position sensor comprising:
   a movable comb-shaped structure disposed at one side of the stiffener comprising at least one movable comb; and
   a fixed comb-shaped structure fixed on the base comprising at least one fixed comb,
   wherein the at least one fixed comb is meshed with the at least one movable comb separated by a predetermined gap for measuring a movement of the XY stage in the first direction and the second direction according to a meshing degree of the at least one movable comb and the at least one fixed comb.

2. The XY stage module of claim 1, wherein the supporting unit comprises:
a supporting member disposed on the base; and
an elastic beam connecting the XY stage and the supporting member;
wherein the elastic beam comprises:
   a first inner elastic beam;
   a first outer elastic beam;
   a second inner elastic beam; and
   a second outer elastic beam;
   wherein the first inner elastic beam and the first outer elastic beam extend toward the first direction, and the second inner elastic beam and the second outer elastic beam extend toward the second direction.

3. The XY stage module of claim 2, wherein the stiffener comprises:
a first stiffener which moves in the first direction according to the movement of the XY stage by being elastically supported by the second outer elastic beam connected to the supporting member and being connected to the first inner elastic beam connected to the XY stage; and
a second stiffener which moves in the second direction according to the movement of the XY stage by being elastically supported by the first outer elastic beam connected to the supporting member and being connected to the second inner elastic beam connected to the XY stage.

4. The XY stage module of claim 3, wherein the movable comb-shaped structure comprises a first movable comb-shaped structure disposed at the first stiffener for moving in the first direction and a second movable comb-shaped structure disposed at the second stiffener for moving in the second direction,
   wherein the fixed comb-shaped structure comprises a first fixed comb-shaped structure and a second fixed comb-shaped structure which are meshed with the first movable comb-shaped structure and the second movable comb-shaped structure, respectively,
   wherein the movement of the XY stage in the first direction is measured according to a first meshing degree of the first movable comb-shaped structure and the first fixed comb-shaped structure, and wherein the movement of the XY stage in the second direction is measured according to a second meshing degree of the second movable comb-shaped structure and the second fixed comb-shaped structure.

5. The XY stage module of claim 1, further comprising a sensor electrode pad disposed on one side of the fixed comb-shaped structure.

6. The XY stage module of claim 1, wherein the thickness of the at least one movable comb and the at least one fixed comb is identical to the thickness of the stiffener.

7. The XY stage module of claim 1, wherein the movable comb-shaped structure and the fixed comb-shaped structure are made of a conductive material.

8. The XY stage module of claim 1, wherein the movable comb-shaped structure is electrically insulated from the fixed comb-shaped structure.

9. A storage system comprising:
an XY stage module; and
a probe array disposed above a medium mounted on the XY stage module which records and reads information on each cell of the medium,
wherein the XY stage module comprises:
   a base;
   an XY stage horizontally moving above the base to a first direction and a second direction wherein the second direction is orthogonal to the first direction;
   a supporting unit disposed on the base which elastically supports the XY stage;
   a stiffener which prevents the XY stage from being rotated;
   a position sensor comprising:
      a movable comb-shaped structure disposed at one side of the stiffener comprising at least one movable comb; and
      a fixed comb-shaped structure fixed on the base comprising at least one of fixed comb;
   wherein the at least one fixed comb is meshed with the at least one movable comb separated by a predetermined gap for measuring a movement of the XY stage in the first direction and the second direction according to a meshing degree of the at least one movable comb and the at least one fixed comb.

10. The storage system of claim 9, wherein the supporting unit comprises
a supporting member disposed on the base; and
an elastic beam connecting the XY stage and the supporting member, wherein the elastic beam comprises:
   a first inner elastic beam;
   a first outer elastic beam;
   a second inner elastic beam; and
   a second outer elastic beam;
   wherein the first inner elastic beam and the first outer elastic beam extend toward the first direction, and a second inner elastic beam and a second outer elastic beam extend toward the second direction.

11. The storage system of claim 10, wherein the stiffener comprises:
a first stiffener which moves in the first direction according to the movement of the XY stage by being elastically supported by the second outer elastic beam connected to the supporting member and being connected to the first inner elastic beam connected to the XY stage; and
a second stiffener which moves in the second direction according to the movement of the XY stage by being elastically supported by the first outer elastic beam connected to the supporting member and being connected to the second inner elastic beam connected to the XY stage.

12. The storage system of claim 11, wherein the movable comb-shaped structure comprises a first movable comb-shaped structure disposed at the first stiffener for moving in the first direction and a second movable comb-shaped structure disposed at the second stiffener for moving in the second direction, wherein the fixed comb-shaped structure comprises a first fixed comb-shaped structure and a second fixed comb-shaped structure which are meshed with the first movable comb-shaped structure and the second movable comb-shaped structure, wherein the movement of the XY stage in the first direction is measured according to a first meshing degree of the first movable comb-shaped structure and the first fixed comb-shaped structure, and the movement of the XY stage in the second direction is measured according to a second meshing degree of the second movable comb-shaped structure and the second fixed comb-shaped structure.

13. The storage system of claim 9, further comprising a sensor electrode pad disposed on one side of the fixed comb-shaped structure.

14. The storage system of claim 9, wherein the thickness of the at least one movable comb and the at least one fixed comb is identical to the thickness of the stiffener.

15. The storage system of claim 9, wherein the movable comb-shaped structure and the fixed comb-shaped structure are made of a conductive material.

16. The storage system of claim 9, wherein the movable comb-shaped structure is electrically insulated from the fixed comb-shaped structure.

17. A method of fabricating an XY stage module comprising:

preparing a first board sectored into a center area as an XY stage, a first peripheral area and a second peripheral area corresponding to a fixed comb-shaped structure and a supporting member, respectively, and a connecting area corresponding to a supporting unit connected to the center area and the second peripheral area;

preparing a second board corresponding to a base;

forming a groove in the center area and the connecting area on a bottom of the first board;

bonding the bottom of the first board to the second board;

forming a sensor electrode pad on the first peripheral area on a top of the first board; and forming a supporting structure between the center area and the second peripheral area and a comb-shaped structure having combs meshed with one another between the center area and the first peripheral area by etching the first board.

18. The method of claim 17, further comprising:

forming a coil at the center area of the top of the first board before forming the sensor electrode pad; and forming a driving electrode pad to be connected to the coil when the sensor electrode pad is formed.

19. The method of claim 18, wherein the forming of the coil comprises:

forming a trench in the first board before forming the groove in the first board;

depositing a seed layer on top of the first board after bonding the first board and the second board, and filling the trench with a metal layer on the seed layer; and eliminating the metal that is above the trench by polishing.

* * * * *